under Patented Feb. 13, 1973

United States Patent Office 3,715,965

3,715,965
PRESET DIAPHRAGM FOR INTERCHANGEABLE LENSES OF SINGLE-LENS MIRROR REFLEX CAMERAS
Alf Ingvar Alfredsson, Savedalen, Sweden, assignor to Fritz Victor Hasselblad
Filed Dec. 9, 1970, Ser. No. 96,560
Claims priority, application Sweden, May 6, 1970, 6,236/70
Int. Cl. G03b 9/07
U.S. Cl. 95—64 B       8 Claims

ABSTRACT OF THE DISCLOSURE

A preset diaphragm for an interchangeable lens of a single-lens mirror reflex camera in which the diaphragm is controlled by a mechanism in the camera body having a shaft detachably coupled in the edge of the lens mount which rotates in one direction during release of the camera and in the opposite direction during film transport and this rotational movement is transferred to a shaft in the lens which opens and closes the preset diaphragm by turning the diaphragm cover. Specifically, the shaft in the lens carries a cam disc which is spring-loaded and pivotally mounted on one leg of an angle lever. The other leg of the angle lever is resiliently connected with a guide plate for the diaphragm cover. In operation, the angle lever and guide plate are turned relative to one another when the guide plate movement is stopped at the preset aperture value thus allowing the cam disc to complete its rotation by the mechanism in the camera body.

---

This invention relates to single-lens mirror reflex cameras with interchangeable lenses where the preset diaphragm of the lens is controlled by a rotary movement transferred from the camera body.

By means of this invention, it is possible to provide automatic diaphragm operation for the interchangeable lenses of a reflex camera irrespective of whether the lens is of the between-lens shutter type or of the type not having a built-in shutter. In both instances, automatic diaphragm operation occurs in response to the same operation of a control mechanism on the camera body, thereby making it possible to use both a between-lens shutter on the camera and actuate both shutter and aperture by the control mechanism or, in the alternative, to use a lens which has no shutter and instead use the focal plane shutter on the camera while still actuating the lens diaphragm by the same control mechanism. The invention, more precisely, relates to a preset diaphragm controlled by a shaft within the camera body which at the release of the camera rotates in one direction and which in response to the film transport, rotates in the opposite direction. These short movements are transferred to a shaft in the lens by means of a detachable coupling.

Hitherto, single-lens mirror reflex cameras with interchangeable lenses, which are equipped with a between-lens shutter and preset diaphragm have been known in the art. On such a camera, the camera body includes a combination mechanism, which, in connection with the film transport, tensions the spring mechanisms for controlling the viewfinder mirror and cocks the between-lens shutter and the preset diaphragm of the lens. In the cases here referred to, the between-lens shutter and the preset diaphragm are operated by means of a rotatable shaft in the camera body, which is connected to a corresponding shaft in the interchangeable lens by means of a detachable coupling at the edge of the lens mount on the front side of the camera body. To control the between-lens shutter and the preset diaphragm by a rotary movement, this movement had to be carried out in one direction of rotation for the release of the camera shutter and in the opposite direction in response to the film transport.

The aforedescribed mechanism in the camera body which transfers the reciprocatory rotary movement to the lens, has proved to be highly reliable in operation and relatively simple to manufacture. It is, therefore, desired to maintain this construction unchanged for controlling the preset diaphragm in lenses having no between-lens shutter, although this simpler control per se can be carried out with only one direction of rotation of the operating shaft.

By maintaining the construction unchanged, a further essential advantage is obtained, as it will then be possible to control interchangeable lenses both with and without a between-lens shutter by the same mechanism in the camera body. This provides the possibility of utilizing lenses with only a preset diaphragm for pure focal plane shutter cameras as well as for so-called combination cameras in which the exposure can be effected by the focal plane shutter of the camera body and, alternatively, by a between-lens shutter built to the interchangeable lens in instances when a lens of such type is fitted onto the camera. A lens without a between-lens shutter may also be used on a camera body without focal plane shutter, if the shutter speed can be controlled, for example, by igniting and extinguishing the light source. In that case the flap or flaps, which cover the image plane except during the exposure proper, act as an auxiliary shutter. Inversely, an interchangeable lens with between-lens shutter can be utilized for pure between-lens shutter cameras as well as for combination cameras.

Thus, by maintaining the construction of the mechanism in the camera body for control of the interchangeable lens unchanged, it will not be necessary to keep available entirely different assortments of interchangeable lenses for the respective types of the aforedescribed camera systems, because their application ranges to a large extent are the same for the different camera types. This means a substantial savings for the buyer of a camera.

The advantages mentioned above are achieved by a construction according to the invention which is based on the abovementioned previously known mechanism in the camera body for control of the between-lens shutter and preset diaphragm of the interchangeable lens and on a preset diaphragm of a construction known per se. Heretofore, these two known constructions could not be used together, because the actuation movement required by the preset diaphragm was different from that which the mechanism mentioned is capable to bring about.

The invention, therefore, comprises a mechanical adaptation of these constructions to each other. The mechanism in the camera body is maintained unchanged, the control means of the preset diaphragm constituting the novel feature of the invention. The preset diaphragm, which can be used even if the camera body is provided with a viewfinder mirror returning to folded-down position subsequent to exposure, is fully open until the camera is released. Upon said release, the mechanism in the camera body is started, in such a manner, that by its rotary movement at first it stops down the lens to a preset aperture value, whereafter it releases the shutter in the camera body, and during the continued rotary movement returns the preset diaphragm to widest aperture.

The invention renders it possible, furthermore, to combine the preset diaphragm with a known device for manual stop-down used for monitoring the depth of field.

An embodiment of the invention is described in the following in greater detail, with reference to the accompanying drawings.

Figure 1:
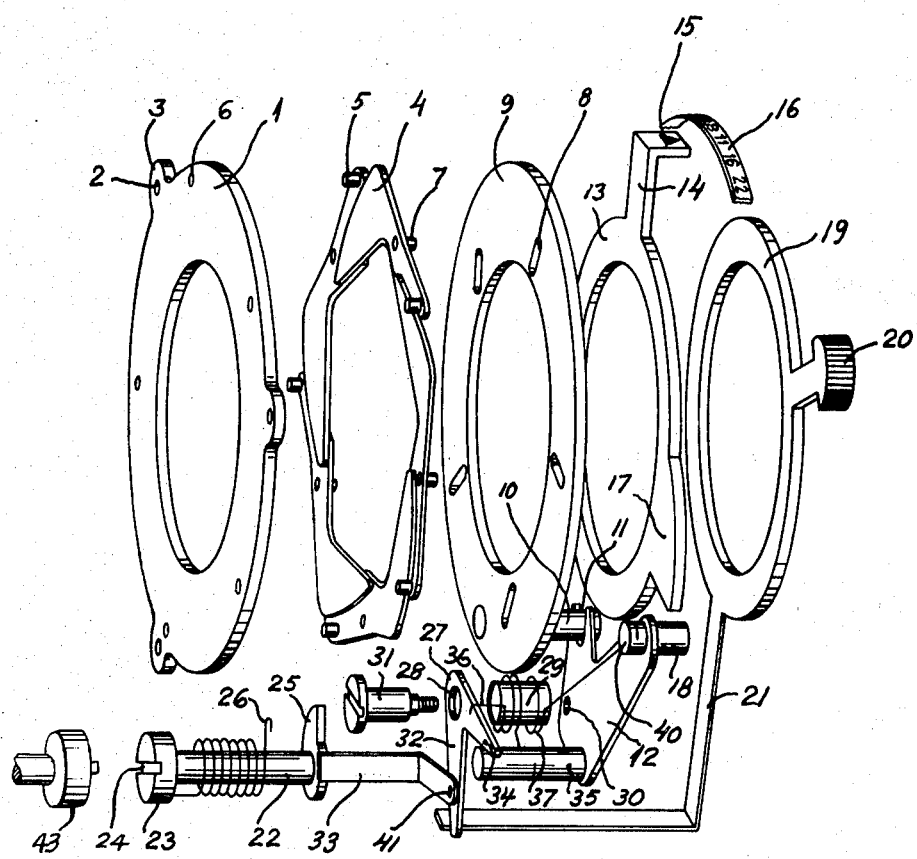
FIG. 1 is a perspective exploded view of a preset diaphragm with manual stop-down, the various elements thereby being shown in the positions they occupy prior to the camera release.

The reference numerals are common to FIGS. 1–4. Hereinafter the terms "clockwise" and "counterclockwise," respectively, refer to the directions seen from the rear side of the camera body to the lens.

FIG. 1 in its upper part shows a series of annular details constituting a preset diaphragm from interchangeable lenses with associated means for manual stop-down, all of these details being of a previously known design. Toward the bottom of FIG. 1 those details are shown which according to the invention, operate the preset diaphragm by the aid of the known reciprocatory rotational movement, which, by a detachable coupling, is transferred from the control mechanism (not shown) in the camera body. The preset diaphragm is held assembled by an outer cover 1 secured on the lens by screws (not shown) through holes 2 in lugs 3 of the cover 1. Inside thereof, a number of diaphragm blades 4 are located which are supported on pins 5 in holes 6 in the cover 1. Said diaphragm blades 4 are provided with guide pins 7 running in oblique guide grooves 8 in a diaphragm drive ring 9 placed therebehind. Said drive ring 9 is mounted rotatably in the lens and caused to move by a dog pin 10 resting in a recess 11 in a guide plate 12. Behind the diaphragm drive ring 9 a ring 13 is mounted rotatably for adjusting the preset aperture value, the controlling part of the ring being a cam curve 17 and its adjusting means comprising an operating lever 14 with an index 15 to be set against a stationary aperture scale 16 on the lens.

The position of the cam curve 17 is sensed by a pin 18 on the guide plate 12 and thereby limits the counterclockwise movement of the dog 10 to the preset value of the aperture scale when the diaphragm drive ring 9 rotates clockwise and by the guide grooves 8 turns the diaphragm blades 4 inwardly on the pins 5. A ring 19 for manual stop-down at field-depth control is mounted rotatably behind the ring 13 for the preset diaphragm and is rotated manually by a catch 20 whereby an angle lever 21 actuates the control mechanism of the preset diaphragm in a manner described below in greater detail.

The control means for the preset diaphragm and, when provided for the between-lens shutter has on the camera side the shape of a short pin 43 projecting outwardly into the edge of the lens mount, the free end of said pin, for example, being given chisel-shape for engaging with a corresponding groove in the lens portion. The control is made as follows. Upon the release of the camera, the pin rotates counterclockwise through approx. 270° about its center axle and thereafter interrupts its rotation. During this moment, the lens is stopped down to the preset aperture value whereafter the shutter exposes. Upon completion of the exposure, the pin continues its rotation counterclockwise through about 45° to its final position. The preset diaphragm then returns to widest aperture. Upon the next following film transport, the mechanism in the camera body again is cocked, and thereby the pin rotates clockwise to the starting position without actuating the preset diaphragm, which remains wide open. The described operation cycle is repeated upon a new release of the camera.

Incidentally, the above description makes it apparent that each cycle of operation involves a plurality of sequential steps; accordingly, when the phrase "release of camera" is used herein, it is intended to refer to the initiation of such sequence.

The reciprocatory rotation movement of the control means in the camera body is transferred to a shaft 22 mounted in the lense, the shaft end facing the camera body being formed as a dog member head 23 with a coupling groove 24. The other end of the shaft 22 is provided with a cam disc 25 actuating the operation means of the preset diaphragm. A return spring 26 mounted on the shaft 22 is fastened with its movable end at the dog member head 23 and with its opposite fixed end at the lens (not shown). Said spring urges the shaft 22 to its starting position when it rotates clockwise. An angle lever 27 mounted in a bore 28, a distance sleeve 29, and the guide plate 12 mounted in a bore 30 are supported in common on a screw 31 secured on the lens (not shown). The angle lever 27 has one leg 32 provided with a movable angular cam follower member 33 pivoted on a journal 41. Said cam follower member 33 rests against the cam disc 25. In lateral direction, the cam follower member 33 is guided by a pin 38 and by a weak leaf spring 39, see FIGS. 2–4, both fastened in the lens. Against the leg 32 rests the actuating arm 21 for manual stop-down.

Figure 2:
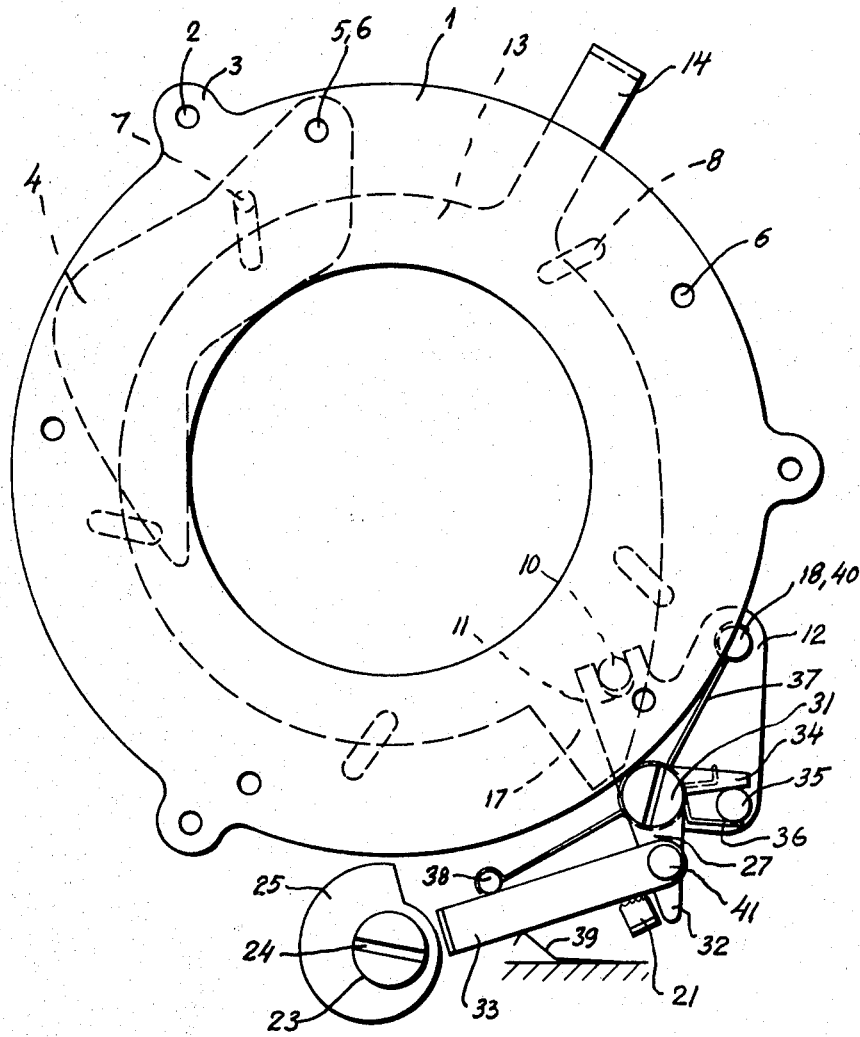
FIG. 2 shows the arrangement according to FIG. 1, seen in a plane view from the camera body and showing one blade of the diaphragm.
Figure 3:
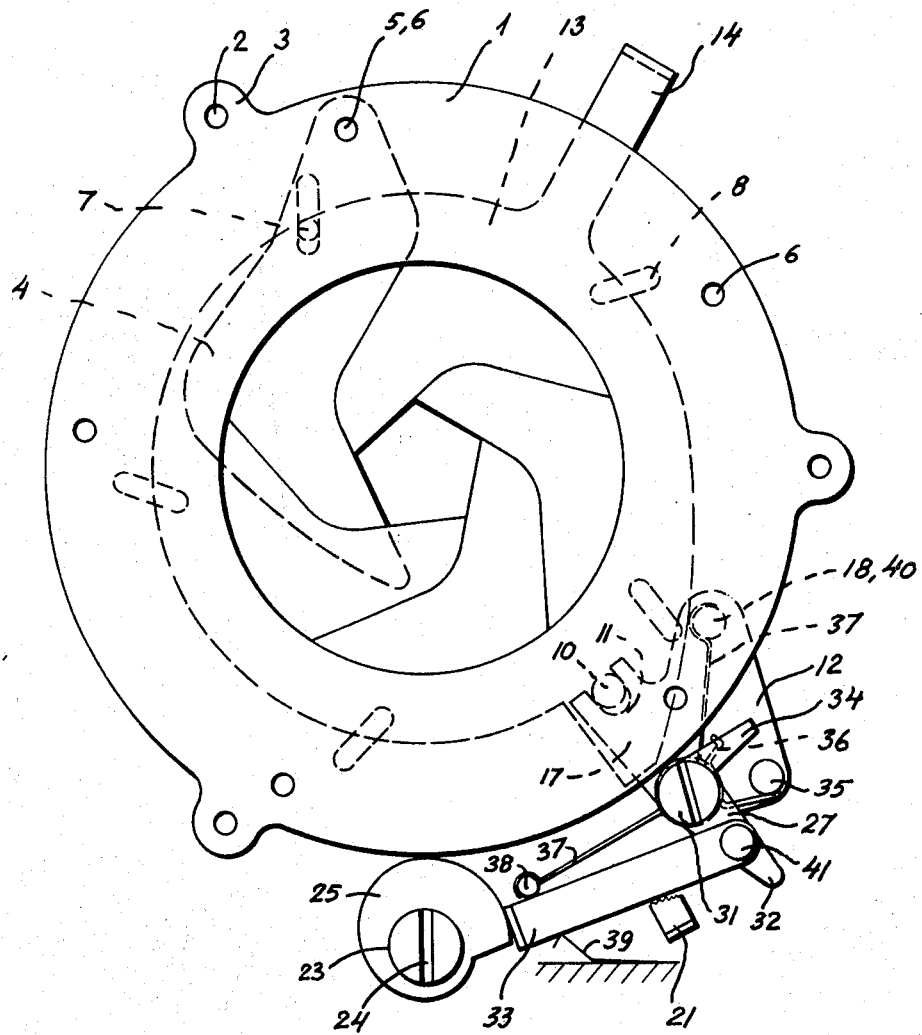
FIG. 3 shows in a plane view the arrangement according to FIG. 1, but with five diaphragm blades, the preset diaphragm being stopped down to the preset aperture value.

The angle lever 27 has a second leg 34, which actuates a pin 35 on the guide plate 12. A helical spring 36 mounted on the distance sleeve 29 presses the leg 34 against the pin 35. A second helical spring 37 mounted on the distance sleeve 29 embraces with one end a pin 40 on the guide plate 12 and with its other end the pin 38, urging the guide plate 12 clockwise (FIGS. 2–4).

The camera being ready for exposure (FIGS. 1 and 2), the cam follower member 33 is on the lowermost portion of the cam disc 25 of smallest radius, the angle lever 27 having been turned to its outer position in clockwise direction. The spring 36, in urging the leg 34 of the angle lever 27 in abutting relationship with the pin 35 on the guide plate 12, then has turned the guide plate 12 in clockwise direction, whereby the spring 36 was assisted by the helical spring 37. The recess 11 has taken along the dog pin 10 on the diaphragm drive ring 9, which thereby was turned counterclockwise. Hereby the guide pins 7 on the diaphragm blades 4 were moved radially outwardly by the oblique straight guide grooves 8 in the diaphragm drive ring until they arrived at the outermost position in said grooves 8. The diaphragm blades 4 then have been pivoted outwardly about the journals 5 so that the aperture is wide open.

When thereafter the camera is released, the mechanism in the camera body turns the shaft 22 counterclockwise through about 270° whereby the cam follower member 33 will now rest on the part of the cam disc 25 having the greatest radius (FIG. 3) when said movement is completed. The angle lever 27, pin 35 and guide plate 12, by action of the helical springs 36, 37, are all urged counterclockwise as far as possible whereby the diaphragm drive ring 9 is turned clockwise by the pin 10 and starts closing the diaphragm blades 4. The guide plate 12 having been turned counterclockwise such a distance that the pin 18 is brought into contact with the cam disc 17 on the ring 13 for the preset diaphragm, the guide plate 12 is now stopped in its movement and the stopping-down is interrupted. When the movement of guide plate 12 has been stopped before the rotation movement controlled by the mechanism in the camera body is completed, the angle lever 27 continues to rotate counterclockwise, whereby the leg 34 is forced to disengage from the pin 35 on the guide plate 12 and the helical spring 36 is tensioned. The position in which the stop-down is stopped, is the preset aperture value determined by the angle position occupied by the ring 13 with its cam curve 17, i.e. the value set on the aperture scale 16. When the stop-down is completed, the release of the camera has proceeded so much that the shutter exposes. This exposure is controlled by the mechanism built-in in the camera body.

Figure 4:
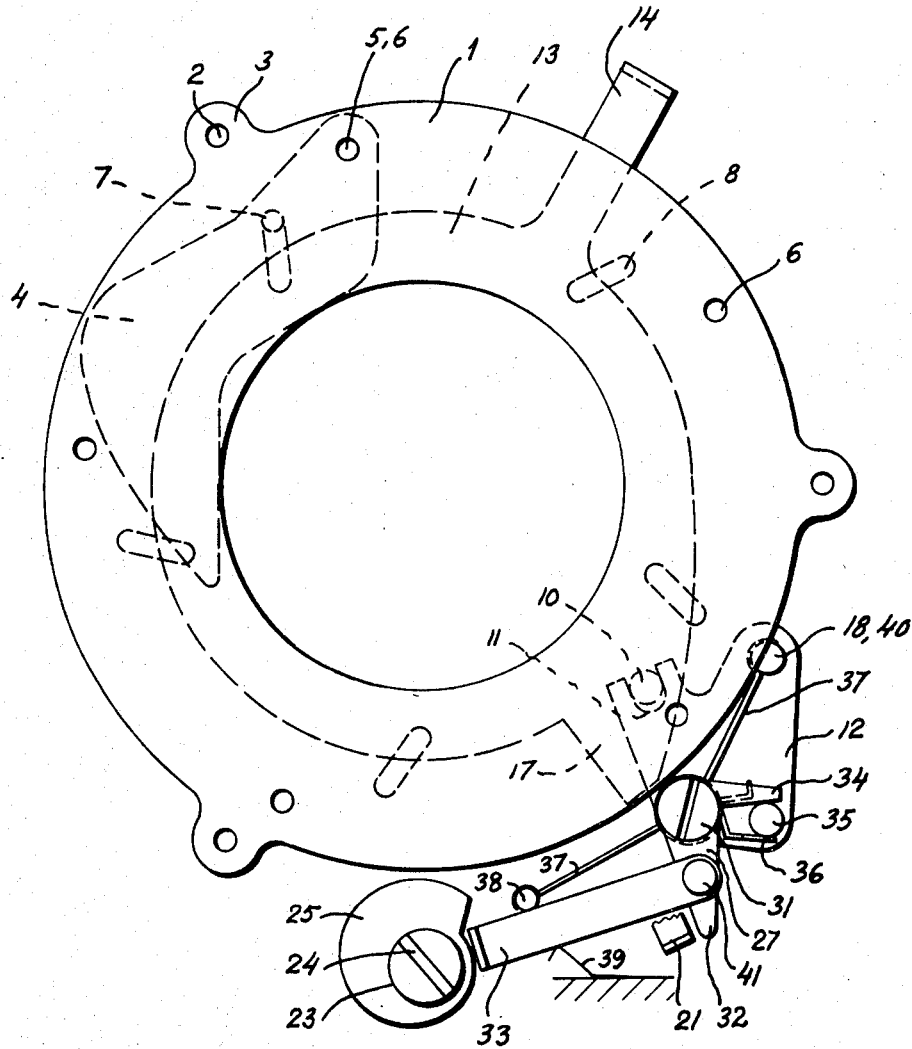
FIG. 4 shows the same plane view of the preset diaphragm subsequent to completed exposure, but with only one blade.

Upon release of the camera release button, the interruption made by the shaft 22 during the exposure is brought to an end, and the shaft rotates counterclockwise through an additional angle of about 45°, whereafter it stops in its final position (FIG. 4). During this phase of the camera release the cam follower member 33 leaves the part of the cam disc 25 having the greatest radius and slides downwardly along the steep portion connecting such portion with the portion having the least radius, at which latter portion it remains. As a result, the above-described procedure for effecting automatic stop-down is reversed, and the diaphragm returns to widest aperture.

When the mechanism in the camera body again is cocked in connection with the film transport, the shaft 22 rotates clockwise back to the starting position. The cam follower member 33 being rotatably mounted on the pin 41, the member 33 rotates counterclockwise and tensions the weak leaf spring 39 when the cam follower member 33 gives way to the above-mentioned steep portion of the cam disc 25. By reason of the correct dimensioning of the helical springs 36, 37 and of the leaf spring 39, the counterclockwise rotation of the cam follower member 33 easily results in the flexure of the weak spring 39 but without actuating lever 27 against the restraining action of the considerably stronger helical springs 36 and 37; consequently, the aperture remains wide open. Upon completion of the rotation of shaft 22, the cam follower member 33 has followed with the cam disc 25 to its portion of least radius, and at the same time the leaf spring 39 has returned it to the starting position. The preset diaphragm is now again in the position shown in FIG. 2.

When the lens is equipped for field-depth control with a means for manual stop-down, as shown in FIG. 1, this stop-down can be made both with the camera ready for exposure (FIGS. 1 and 2) and with the released camera (FIG. 4). By turning the ring 19 counterclockwise with the catch 20, the actuating arm 21 actuates the leg 32 of the angle level 27 in the same way as when the cam follower member 33 controlled by the cam disc 25 actuates the aforedescribed automatic stop-down to the preset aperture value. A suitable aperture value is then to be found by trials in the usual way with the help of the operation lever 14 with its index 15 and the aperture scale 16.

The design of the invention shown in FIGS. 1–4 is only one example of a preferred embodiment. Individual details may be varied within wide limits with respect to shape and place within the scope of the basic inventive idea. The relative angle positions, for example, between the location of the shaft 22 and the location of the operation lever 14 and catch 20, respectively, can be adjusted to the combination in question of camera body and lens. Furthermore, the springs 26, 36 and 37 can be varied with respect to shape and place. Finally, the means for manual stop-down can be abolished without thereby affecting the means for the automatic operation of the preset diaphragm.

I claim:

1. Apparatus for control of the diaphragm of an interchangeable lens for a single-lens mirror reflex camera, said diaphragm control apparatus being of the type which is operable in response to actuation of a control mechanism in the camera body which includes a control member operable in one direction upon release of the camera and in the opposite direction at the time of film transport, said diaphragm control apparatus including in combination:

a shaft on the lens rotatable by said control member through a predetermined angle in one direction in response to actuation of the control member in said one direction and through a predetermined angle in the opposite direction in response to actuation of the control member in the opposite direction, a cam surface rotatable with said shaft, a pivotable lever having first and second legs, a cam follower member pivotably connected to said one leg of said lever and being actuable in response to said cam surface so as to pivot said lever, a pivotable diaphragm guide plate, resilient connecting means responsive to movement of said second leg of said pivotable lever for actuating said guide plate, diaphragm preset aperture setting means defining a profiled surface for variably limiting the extent of rotation of said guide plate, and a diaphragm drive ring rotatable in response to the pivoting of said guide plate by said lever and as limited by said aperture setting means, said resilient connecting means permitting said cam follower member to move a predetermined amount in response to the predetermined angle of rotation of said shaft in said one direction despite the variable limitation of movement of said guide plate effected by said aperture setting means.

2. The diaphragm control apparatus of claim 1 wherein said cam surface is contoured to provide a gradually varying radius over a first portion of its rotation in one direction and a rapidly varying radius over a second portion of its rotation in said one direction, said apparatus further including a resilient means rotationally biasing said cam follower elements to a predetermined position, said resilient means being weaker than said resilient connection between said second leg of said pivotable levers and said guide plate so as to prevent movement of said lever and said guide plate and thus also of said diaphragm drive ring when said cam surface is rotated in said opposite direction at the time of film transport.

3. The apparatus of claim 1 which further includes a stationary pin which prevents said cam follower from sliding off said cam surface when said cam surface has been rotated to its full counterclockwise position.

4. The apparatus of claim 1 wherein said pivotable lever and said guide plate are supported on a common shaft.

5. The apparatus of claim 1 which further includes a manual step-down means to actuate said pivotable lever independently of said cam follower member.

6. Apparatus for the control of the diaphragm of an interchangeable lens on a camera including in combination:

an element on the camera body which is movable in one direction upon release of the camera and in the opposite direction at the time of film transport, a shaft on the lens which engages with said element when said lens is mounted on the camera body and which rotates in one direction when said element moves in said one direction and rotates in the opposite direction when said element moves in the opposite direction, a cam rotatable with said shaft, a pivotably supported cam follower which is movable both rotationally and in translation by the contoured cam surface of said cam, spring means biasing said cam follower to a predetermined rotational position about its pivot, diaphragm actuating means, resilient coupling means responsive to movement of said cam follower to actuate said diaphragm actuating means, means limiting the extent of actuation of said diaphragm actuating means in response to said cam follower, said cam surface when rotating in said one direction actuating said cam follower in translation and thusly also said diaphragm actuating means through said resilient means and closing said diaphragm to the extent permitted by said limiting means, said spring means being substantially weaker than said resilient means so as to permit rotation of said cam follower about its pivot against the restraining force of said spring means as said cam rotates in said opposite direction without producing operation of said diaphragm actuating means to thereby permit the diaphragm to remain open during film transport.

7. The combination of claim 6 wherein said spring biasing means comprises a weak leaf spring and said resilient means comprises at least one helical spring.

8. The combination of claim 6 wherein said cam is provided with a contoured surface which increases gradually in radius over a first portion thereof which is effective on said cam follower during a corresponding first part of the rotation of said cam in said one direction; said contoured surface decreasing steeply in radius over a second portion thereof which is effective on said cam follower during a corresponding second part of the rotation of said cam in said one direction; said cam follower, said resilient coupling means, and said diaphragm actuating means jointly being operable to open said diaphragm when the cam surface portion of minimum radius is effective on said cam follower and to close the diaphragm when the cam surface portion of maximum radius is effective on said cam follower, said cam as it rotates in said opposite direction during film transport varying steeply in radius from its minimum to its maximum but being effective only to rotate said cam follower against said spring means while being ineffective to move said cam follower in translation and thereby close said diaphragm.

References Cited

UNITED STATES PATENTS

| | | | |
|---|---|---|---|
| 3,273,482 | 9/1966 | Starp | 95—64 C |
| 3,322,051 | 5/1967 | Rentschler | 95—64 R |
| 3,338,145 | 8/1967 | Rentschler et al. | 95—64 R |
| 3,451,325 | 6/1969 | Raab | 95—64 B |
| 3,466,994 | 9/1969 | Holderbaum | 95—64 B |

SAMUEL S. MATTHEWS, Primary Examiner

E. M. BERO, Assistant Examiner

U.S. Cl. X.R.

95—64 R